US006810191B2

(12) United States Patent
Ferris et al.

(10) Patent No.: US 6,810,191 B2
(45) Date of Patent: Oct. 26, 2004

(54) CABLE TROUGH COVER

(75) Inventors: Matthew D. Ferris, Carver, MN (US); Joel T. Fisher, South St. Paul, MN (US)

(73) Assignee: ADC Telecommunications, Inc., Eden Prairie, MN (US)

(*) Notice: Subject to any disclaimer, the term of this patent is extended or adjusted under 35 U.S.C. 154(b) by 0 days.

(21) Appl. No.: 09/910,418

(22) Filed: Jul. 20, 2001

(65) Prior Publication Data

US 2003/0016931 A1 Jan. 23, 2003

(51) Int. Cl.[7] .............................. G02B 6/00; F16L 3/22; H02G 3/04
(52) U.S. Cl. ...................... 385/134; 248/68.1; 174/68.3
(58) Field of Search ................................ 385/134, 135, 385/136; 248/49, 68.1; 174/48, 68.3

(56) References Cited

U.S. PATENT DOCUMENTS

| 917,328 A | 4/1909 | Lutz |
| D269,968 S | 8/1983 | Rodriguez Moura |
| 4,406,379 A | 9/1983 | Anderson et al. |
| 4,627,469 A | 12/1986 | Buard .......................... 138/92 |
| 4,640,314 A | 2/1987 | Mock |
| 4,942,271 A | 7/1990 | Corsi et al. |
| 5,067,678 A | 11/1991 | Henneberger et al. ..... 248/68.1 |
| 5,134,250 A | 7/1992 | Caveney et al. |
| 5,160,811 A | 11/1992 | Ritzmann .................. 174/68.3 |
| 5,161,580 A | 11/1992 | Klug ............................ 138/92 |
| 5,235,136 A | 8/1993 | Santucci et al. |
| 5,240,209 A | 8/1993 | Kutsch ........................ 248/49 |
| 5,271,585 A | 12/1993 | Zetena, Jr. .................... 248/49 |
| 5,316,243 A | 5/1994 | Henneberger .............. 248/68.1 |
| 5,316,244 A | 5/1994 | Zetena, Jr. .................... 248/49 |
| 5,335,349 A | 8/1994 | Kutsch et al. ............... 455/6.1 |
| 5,503,354 A | 4/1996 | Lohf et al. .................... 248/58 |

(List continued on next page.)

FOREIGN PATENT DOCUMENTS

| DE | 84 12 625.6 | 7/1984 |
| EP | 1 284 535 A1 | 2/2003 |
| EP | 1 317 040 A1 | 6/2003 |
| FR | 2 406 327 | 10/1977 |
| FR | 2 425 518 | 3/1979 |
| GB | 1021871 | 3/1966 |
| WO | WO 95/28757 | 10/1995 |
| WO | WO 02/18992 A1 | 3/2002 |
| WO | WO 02/29463 A1 | 4/2002 |

OTHER PUBLICATIONS

ADC Telecommunications brochure entitled "FiberGuide® Fiber Management Systems," 33 pages, dated Oct., 1995.
Warren & Brown & Staff brochure pages entitled "light-paths," Issue 2, 11 pages, dated 1995.
ADC Telecommunications brochure entitled "FiberGuide™ Fiber Management System," 6 pages, dated Jun., 1989.
ADC Telecommunications brochure entitled "ADC Fiber-Guide® System Express Exit™ 2×2," 2 pages, dated 5/99.
ADC Telecommunications brochure entitled "FiberGuide® Fiber Management System," 37 pages, dated 6/98.
ADC Telecommunications brochure entitled "FiberGuide® Fiber Management Systems," 53 pages, dated 09/00.
ADC Telecommunications brochure entitled "FiberGuide® Fiber Management Systems," 54 pages, dated 05/00.

*Primary Examiner*—Georgia Epps
*Assistant Examiner*—Alicia M Harrington
(74) *Attorney, Agent, or Firm*—Merchant & Gould P.C.

(57) ABSTRACT

A cable trough cover assembly and method of assembly including a cover plate and a hinge piece. The cover plate includes a pivot member along at least one edge, and the hinge piece defines a pocket for releasably receiving the pivot member. The pocket and pivot member arrangement allow the cover plate to be rotated relative to a cable trough to which the hinge pieces may be mounted.

38 Claims, 8 Drawing Sheets

U.S. PATENT DOCUMENTS

| | | |
|---|---|---|
| 5,669,106 A | 9/1997 | Daoud |
| 5,728,976 A | 3/1998 | Santucci et al. |
| 5,752,781 A | 5/1998 | Haataja et al. ............... 403/387 |
| 5,923,753 A | 7/1999 | Haataja et al. ............... 379/438 |
| 5,937,131 A | 8/1999 | Haataja et al. ............... 385/136 |
| 5,942,729 A | 8/1999 | Carlson, Jr. et al. |
| 5,995,699 A | 11/1999 | Vargas et al. ............... 385/134 |
| 6,037,538 A | 3/2000 | Brooks ..................... 174/48 |
| 6,076,779 A | 6/2000 | Johnson .................... 248/49 |
| 6,084,180 A | 7/2000 | DeBartolo, Jr. et al. |
| 6,107,575 A | 8/2000 | Miranda |
| 6,107,576 A | 8/2000 | Morton et al. |
| D430,543 S | 9/2000 | Rohder |
| 6,245,998 B1 * | 6/2001 | Curry et al. ............... 174/72 A |
| 6,288,331 B1 | 9/2001 | Wirthwein et al. |
| 6,333,461 B1 | 12/2001 | Marcou et al. |
| 6,380,484 B1 | 4/2002 | Theis et al. |
| 6,437,243 B1 | 8/2002 | VanderVelde et al. |
| 6,437,244 B1 | 8/2002 | Vander Velde |
| 6,476,327 B1 | 11/2002 | Bernard et al. |
| D473,850 S | 4/2003 | Rouleau et al. |
| 2003/0047345 A1 | 3/2003 | Bernard et al. |

* cited by examiner

CABLE TROUGH COVER

FIELD OF THE INVENTION

The invention pertains to systems for the management and routing of optical fiber cables and other cables.

BACKGROUND OF THE INVENTION

In the telecommunications industry, the use of optical fibers for signal transmission is accelerating. With the increased utilization of optical fiber systems, optical fiber cable management requires industry attention. Other telecommunications cables, including copper-based cables benefit from increased attention on cable management.

One area where cable management is necessary is the routing of cables from one piece of equipment to another. For example, in a telecommunications facility, optical fiber cables may be routed between fiber distribution equipment and optical line terminating equipment. In buildings and other structures which carry such equipment, the cable routing can take place in concealed ceiling areas or in any other manner to route cables from one location to another.

When routing cables, it is desirable that any routing system will be readily modifiable and adaptable to changes in equipment needs. Accordingly a routing system is not practical which would require a high capital outlay and which could not be readily adapted to changes in a customer's needs. Namely, if routing paths, once established, are forever fixed, the system cannot adapt. Also, and perhaps most important, any routing system must protect cables from damage. In the use of optical fibers, it is recognized that the fibers should not bend beyond a minimum radius of curvature. For example, it is commonly recognized that optical fibers should not be bent in a radius of less than 1.5 inches.

Current cable management systems typically comprise cable troughs having a base and sidewalls. It is often advantageous to include a cover over the trough to prevent dust and other unwanted objects from falling into and damaging the cables in the trough. There is a need, however, for improved cable trough covers which allow easy access to the cables in the trough yet still protect the cables from damage.

SUMMARY OF THE INVENTION

One aspect of the present invention relates to a cover and hinge assembly including a cover plate and a hinge member. The cover plate includes a pivot member along at least one edge. The hinge member defines a pocket for receiving the pivot member of the cover plate so that the pivot member may be rotated within the pocket, allowing the cover plate to be rotated relative to the hinge member. The pocket is sized to allow the hinge member to be snap-fit into and out of the hinge member.

A trough cover of the preferred embodiment is versatile so that the same cover may be pivoted in either direction. A connecting piece functions as a hinge or latch as the cover is pivoted.

Another aspect of the present invention relates to a cover for covering a cable trough. The cover includes at least one parallel pivot post along each opposite edge of the cover. The cover defines at least one aperture along each pivot post.

A further aspect of the present invention relates to a hinge piece for hingedly mounting a cover plate with a pivot member to a cable trough. The hinge piece includes two arms coupled by a middle member to form a U-shaped recess. The hinge piece defines a detent pocket for releasably receiving the pivot member.

Another aspect of the present invention relates to a cable trough and cover assembly including a cable trough, a cover plate, and a hinge pedestal. The cover plate includes a pivot member along one edge. The hinge pedestal includes a base portion secured to a base of the cable trough and an extending body which defines a pocket for releasably receiving the pivot member of the cover plate and allowing the cover plate to be rotated relative to the trough.

Yet another aspect of the present invention relates to a cable trough assembly including a cable trough, two cover plates, and two hinge pieces. The cover plates include pivot members along at least one edge. The hinge pieces are positioned on sidewalls of the trough. The hinge pieces each define pockets which releasably receive the pivot members of the cover plates so that the cover plates may be rotated relative to the trough.

A further aspect of the present invention relates to a hinge pedestal for mounting a cover plate with a pivot member to a cable trough. The hinge pedestal includes a base which supports an upstanding wall. The upstanding wall defines at least one pocket sized to receive the pivot member of the cover plate so that the pivot member of the cover plate is releasably received in the pocket and so that the cover plate may be rotated relative to the upstanding wall by rotation of the pivot member within the pocket.

Another aspect of the present invention relates to a method of covering a cable trough having two sidewalls. The method includes the steps of providing a hinge piece with a detent pocket and defining a U-shaped recess, positioning the hinge piece on the sidewall so that the sidewall is received in the U-shaped recess, providing a cover plate having a pivot member along at least one edge, and snapping the pivot member of the cover plate into the detent pocket of the hinge piece.

DETAILED DESCRIPTION

Figure 1:
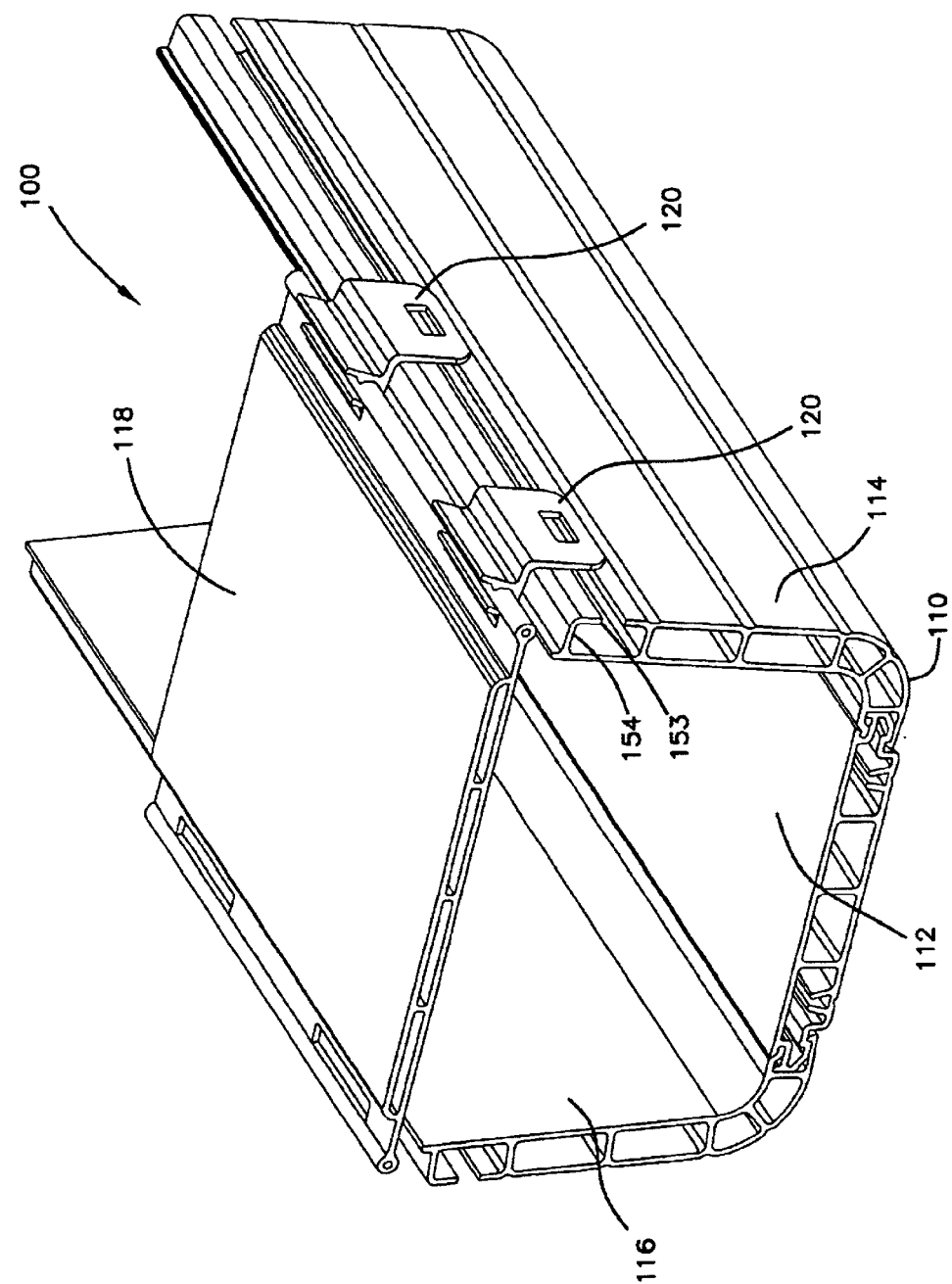
FIG. 1 shows a perspective view of a first embodiment of a cable trough and cover assembly according to the principles of the present invention with cover plate and hinge pieces.

Referring now to FIG. 1, cable trough assembly 100 is shown which includes a cable trough 110 having a base 112 and two sidewalls 114 and 116. The assembly further includes a cover plate 118 and hinge pieces 120. Hinge pieces 120 straddle sidewall 114 and receive cover plate 118 so that a hinged joint is formed between the cover plate 118 and the hinge pieces 120.

The assembly 100 of the present invention allows the cover plate 118 to be snap-fit into the hinge pieces 120 and adjustably positioned in open and closed positions relative to the cable trough 110. For instance, the cover plate may be laid in a closed position over the cable trough to protect cables inside the trough. The cover plate 118 may then be conveniently pivoted by means of the hinge joint into an open position to allow access to the trough interior. Because the cover plates are snap-fit into the hinge pieces, the cover plate may be easily removed from or added to the assembly without the need for time consuming fasteners such as screws.

Figure 2:
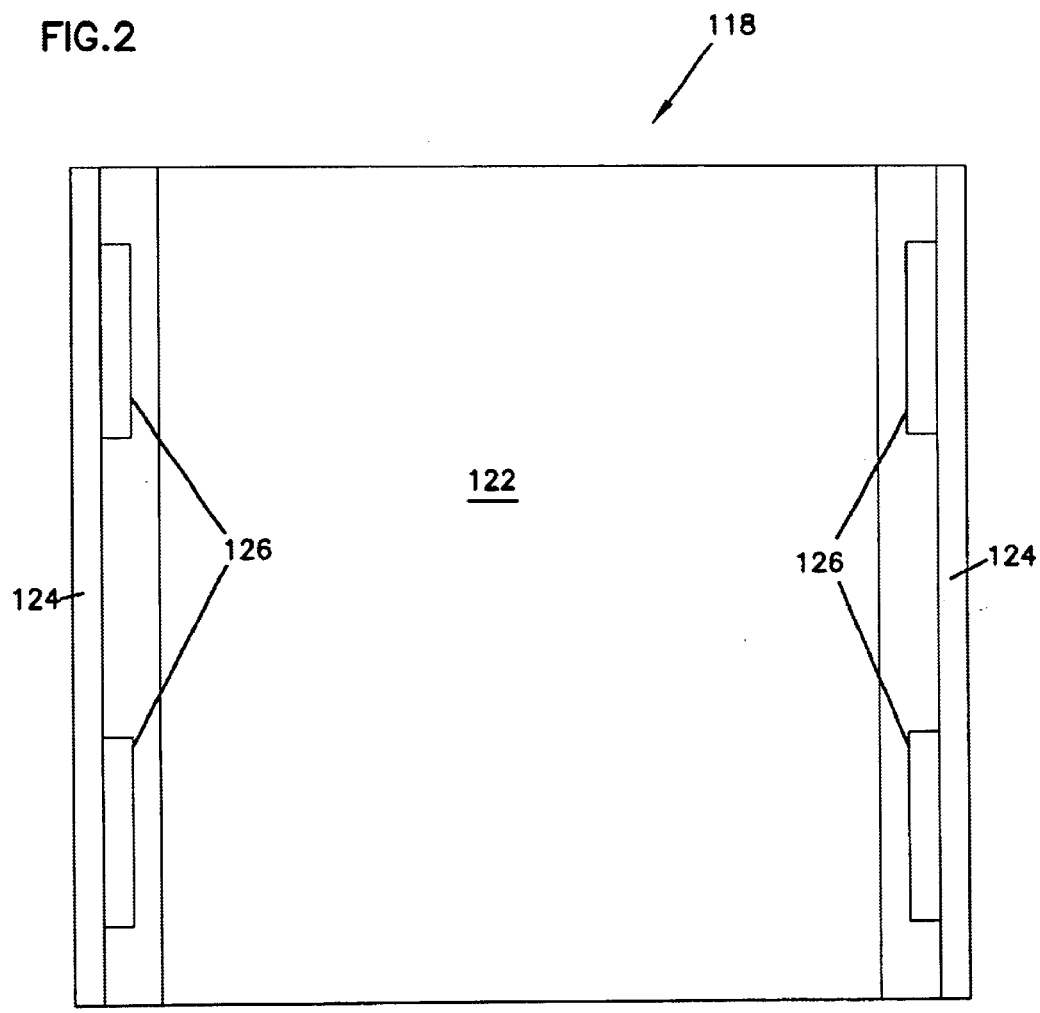
FIG. 2 is a top view of the cover plate shown in FIG. 1.
Figure 3:
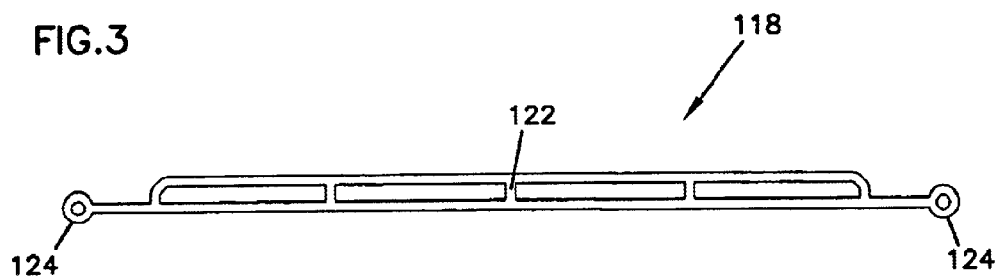
FIG. 3 is an end view of the cover plate of FIG. 2.
Figure 6:
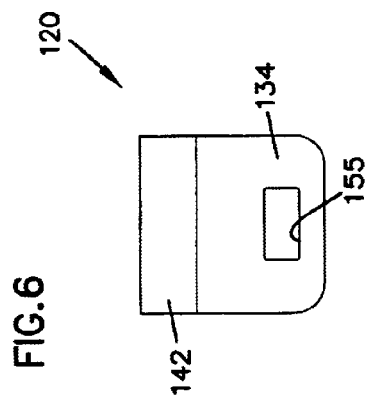
FIG. 6 is a first side view of the hinge piece of FIG. 4.
Figure 9:
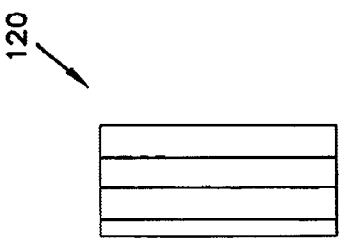
FIG. 9 is a top view of the hinge piece of FIG. 4.
Figure 5:
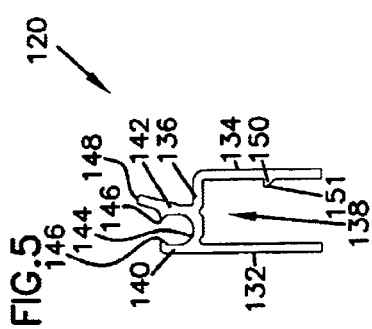
FIG. 5 is an end view of the hinge piece of FIG. 4.
Figure 8:
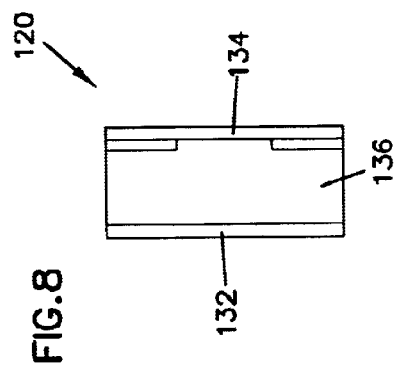
FIG. 8 is a bottom view of the hinge piece of FIG. 4.
Figure 4:
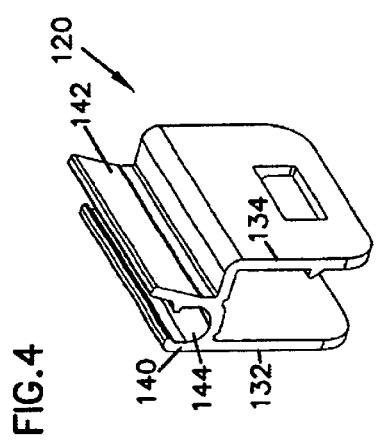
FIG. 4 is a perspective view of the hinge piece of FIG. 1.
Figure 7:
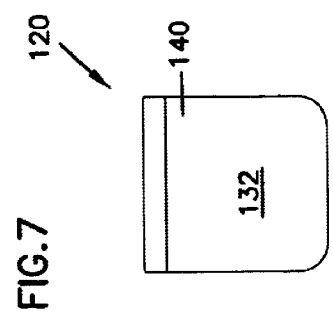
FIG. 7 is a second side view of the hinge piece of FIG. 4.

Referring now to FIGS. 2 and 3, cover plate 118 includes a generally planar member 122 having pivot members 124 disposed along opposite edges of the planar member 122. The pivot members 124 are parallel, rounded posts. The planar member 122 of the cover plate 118 defines a plurality of slots 126 along each pivot member 124. Except for the slots 126, cover plate 118 has a uniform cross section which permits a manufacturer to make the cover plates 118 by extrusion. Slots 126 may be punched out after the cover plates 118 have been extruded.

Referring now to FIGS. 4–9, a hinge piece 120 according to the present invention is shown. Hinge piece 120 includes two opposed arms 132 and 134 joined by a middle portion 136 to form a U-shaped recess 138. The U-shaped recess 138 is sized to receive one of the sidewalls 114 or 116 of cable trough 110. Hinge piece 120 also includes opposed extension members 140 and 142 which define a detent pocket 144. The pocket 144 is shaped as a rounded channel. Bosses 146 protrude from the extension members 140 and 142 toward an interior of the pocket 144. Pocket 144 is sized to receive the pivot members 124 of the cover plate 118. The pivot members 124 can be snap-fit into pocket 144, and bosses 146 act as a detent to retain the pivot member 124 in pocket 144 and to allow the pivot member to be snapped out of the pocket 144. When cover plate 118 is in its closed position as shown in FIG. 1, extension member 140 is received by slot 126 in cover plate 118.

Extension member 142 also includes a push tab 148. By pushing the push tab 148, extension member 142 may be flexed away from extension member 140 which assists in removing the pivot member 124 from pocket 144. In this way the cover plate 118 may be easily snapped out of the hinge piece 120. The cover plate 118, therefore, may be releasably positioned in hinge piece 120. This snap-fit option allows for improved flexibility and efficiency over prior hinge systems requiring screws or fasteners. Tab 148 also functions as a stop to limit the rotation of the cover plate 118.

An inside surface of arm 134 of hinge piece 120 may also include a retaining tab 150 with a ramped surface 151. When the hinge piece 120 is snap-fit to a cable trough such as cable trough 110 shown in FIG. 1, retaining tab 150 opposes an edge 153 of flange 154 on sidewall 114 to hold the hinge piece 120 on the sidewall 114.

Figure 10:
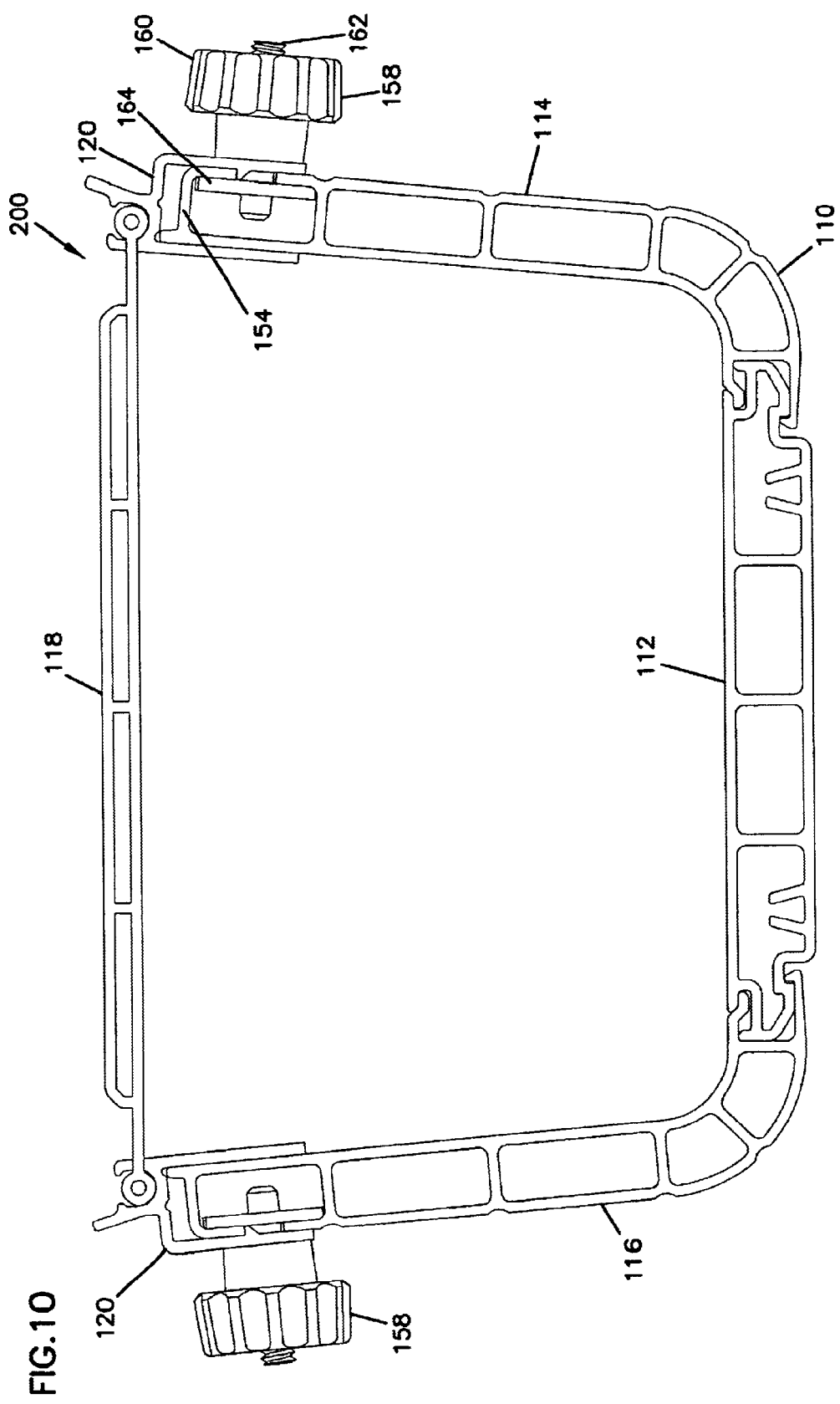
FIG. 10 is an end view of a second embodiment of a cable trough and cover assembly according to the present invention with hinge pieces on both sidewalls of the trough, and fasteners.

In the preferred embodiment, arm 134 of hinge piece 120 may define a fastener window 155 for receiving a fastener. As shown in FIG. 10, fastener 158 may be used to more securely position the hinge piece 120 on the cable trough 110. Fastener 158 includes a tightening knob 160 on a threaded bolt 162 secured to an opposing plate 164. The knob 160 and opposing plate 164 grip flange 154 and hinge piece 120 together. Alternative fasteners could be used such as screws or bolts. The fasteners keep hinge pieces 120 from sliding longitudinally along cable trough 110.

FIG. 10 shows an alternative embodiment cable trough assembly 200 where a hinge piece 120 is placed on both sidewalls 114 and 116. In this arrangement, cover plate 118 may be opened and pivoted in either direction allowing access to the cable trough from either side. An advantage to this design is that the cable technician can access the cable trough interior by pivoting the cover away from the technician, no matter which side of the trough the technician is standing.

Figure 11:
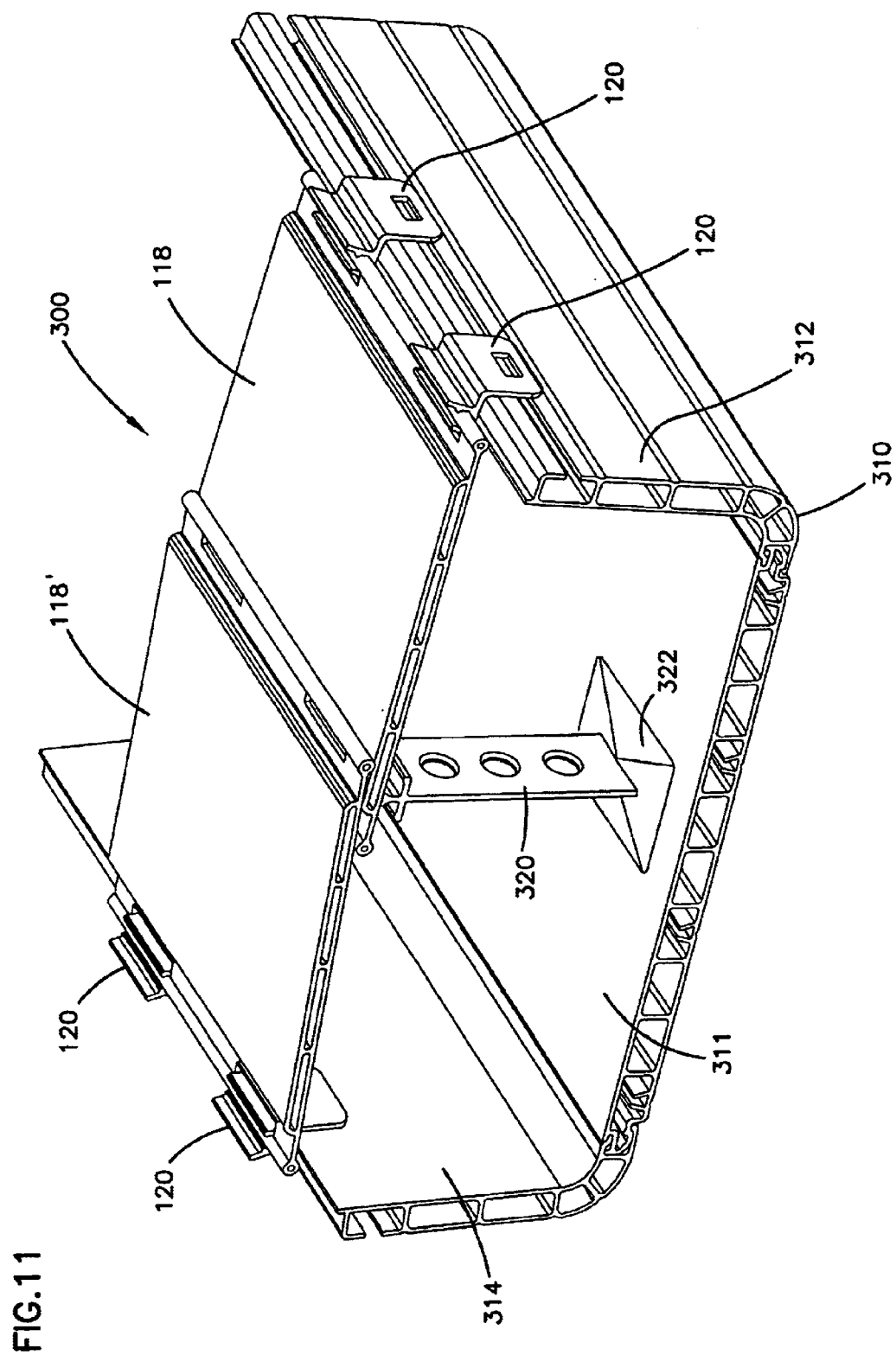
FIG. 11 is a perspective view of a third embodiment of a cable trough and cover assembly according to the principles of the present invention with two cover plates, hinge pieces, and an insert piece.
Figure 12:
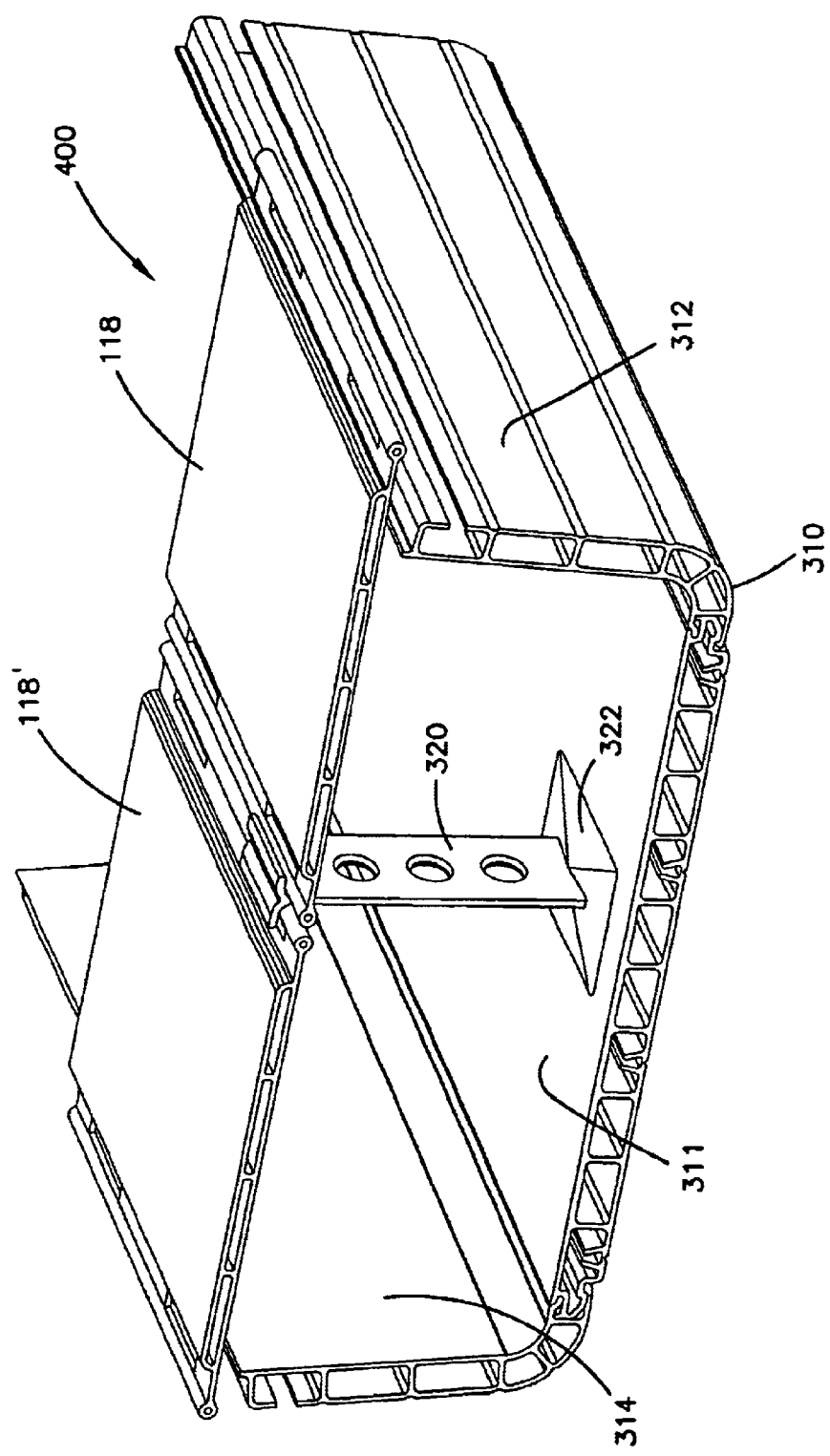
FIG. 12 is a perspective view of a fourth embodiment of a cable trough and cover assembly according to the principles of the present invention with two cover plates positioned in a hinged insert piece.
Figure 16:
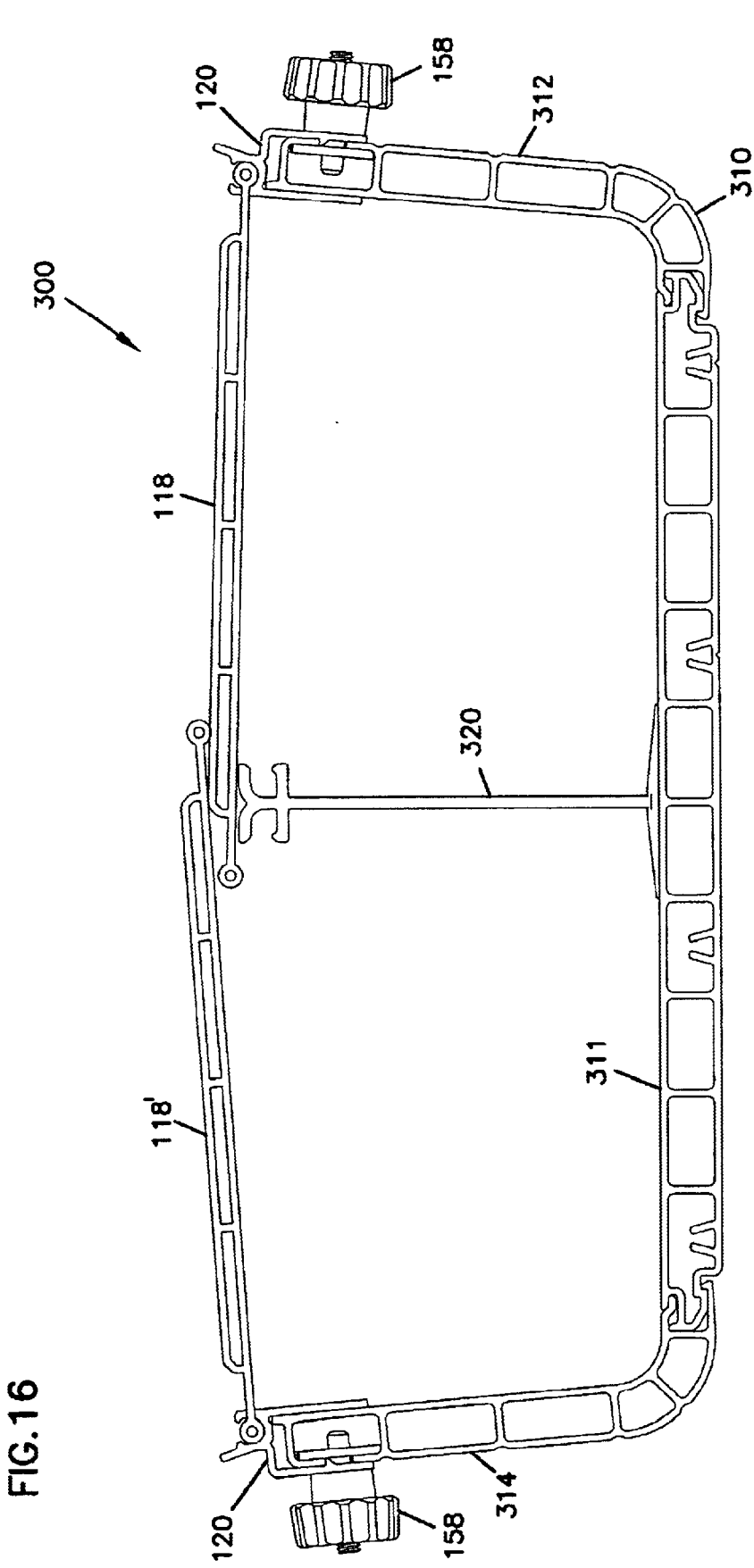
FIG. 16 is an end view of the cable trough assembly of FIG. 11 with fasteners added to secure the hinge pieces to the sidewalls of the cable trough.

FIGS. 11, 12 and 16 show alternative embodiments of the present invention which might be advantageously employed in relatively wide cable troughs such as 12" or 18" wide troughs. FIG. 11 shows a cable trough assembly 300 including a cable trough 310 with a base 311 and sidewalls 312 and 314. Two cover plates 118 and 118'. Each cover plate 118 and 118' is disposed in two hinge pieces 120 which couple the cover plates to the sidewalls of the trough. A hinge pedestal 320 is placed on base 311 of trough 310 between sidewalls 312 and 314 to support free ends of the cover plates 118 and 118'. FIG. 16 shows the assembly 300 of FIG. 11 with fasteners 158 added to help secure the hinge pieces 120 to the cable trough 310.

Figure 15:
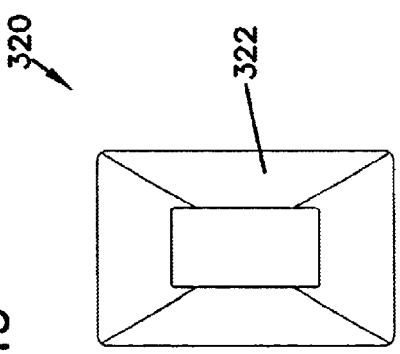
FIG. 15 is a top view of the insert piece of FIG. 12.
Figure 14:
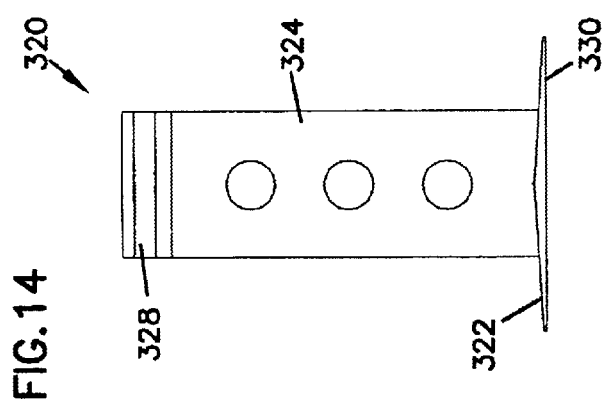
FIG. 14 is a side view of the insert piece of FIG. 12.
Figure 13:
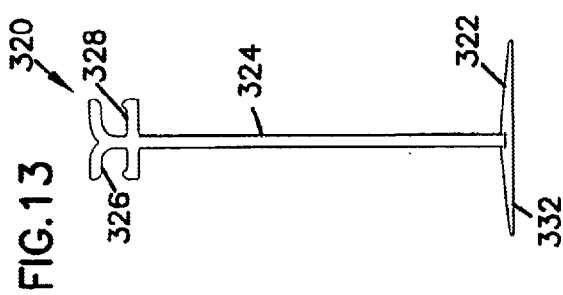
FIG. 13 is an end view of the insert piece of FIG. 12.

Referring now to FIGS. 13–15, hinge pedestal 320 includes a base 322 and an upstanding wall or body 324 extending from the base 322. At its top end the upstanding wall 324 defines two detent pockets 326 and 328 for receiving pivot members 124 of cover plates 118 and 118'. The pedestal 320 may be secured to any desired flat surface. Pedestal may include an adhesive 330 on the planar bottom surface 332 of the base 322. The adhesive 330 might be peel and stick adhesive pads, for instance. Alternatively, the base 322 may define fastener holes so that fasteners such as screws could be received through the fastener holes to secure the pedestal to the cable trough.

As shown in the assembly 400 of FIG. 12, cover plates 118 and 118' may be received by the pockets 326 and 328 of pedestal 320 so that the cover plates 118 and 118' may be pivoted toward the middle of trough 310.

A significant advantage of the cover plates 118, hinge pieces 120 and hinge pedestals 320 of present invention, is that they can be inserted easily into existing cable management systems, effectively retrofitting the existing system. The snap-fit feature of the pivot members and pockets of the cover plates 118 and hinge pieces 120 and hinge pedestals 320 allow covers to be added, opened, closed, and removed without resorting to time intensive fasteners.

With regard to the foregoing description, it is to be understood that changes may be made in detail without departing from the scope of the present invention. It is intended that the specification and depicted aspects of the invention may be considered exemplary, only, with a true scope and spirit of the invention being indicated by the broad meaning of the following claims.

What is claimed is:

1. A cover and hinge assembly for covering a cable trough having a base and two sidewalls, the assembly comprising:
   a cover plate having a pivot member along at least one edge;
   a hinge member including first and second arms coupled by a middle member to form a U-shaped recess for receiving a sidewall of the trough between the first and second arms, the hinge member also defining a detent pocket, the pocket releasably holding the pivot member of the cover plate so that the cover plate may be rotated relative to the hinge member by rotation of the pivot member within the pocket.

2. The cover and hinge assembly of claim 1 wherein the cover plate defines at least one slot for receiving a portion of the hinge member.

3. The cover and hinge assembly of claim 1 wherein the pivot member is a rounded post and wherein the pocket is a rounded channel.

4. The cover and hinge assembly of claim 1 wherein an interior side of the first arm includes a retention tab having a ramped surface.

5. The cover and hinge assembly of claim 1 wherein the pivot member is a first pivot member and wherein the edge is a first edge, and wherein the cover plate includes a second pivot member along a second edge opposite the first edge;
   wherein the assembly further comprises a second hinge member defining a pocket, the pocket releasably holding the second pivot member of the cover plate so that the cover plate may be rotated relative to the second hinge member by rotation of the second pivot member within the pocket of the second hinge member.

6. The cover and hinge assembly of claim 5 wherein the cover plate defines a first slot for receiving a portion of the first hinge member and wherein the cover plate defines a second slot for receiving a portion of the second hinge member.

7. The cover and hinge assembly of claim 5 wherein the first and second pivot members are rounded posts and wherein the pockets of the first and second hinge members are rounded channels.

8. The cover and hinge assembly of claim 5 wherein interior sides of the first arms of the first and second hinge members include a retention tab having a ramped surface.

9. The cover and hinge assembly of claim 1 wherein the pivot member has a generally circular cross-section.

10. A cover for covering a cable trough, the cover plate comprising:
    a cover plate having first and second opposite edges,
    a first pivot post disposed along the first edge of the cover plate and defining a first axis of rotation;
    a second pivot post disposed along the second edge of the cover plate, the second pivot post being parallel to the first pivot post and defining a second different axis of rotation;
    wherein the cover plate defines a plurality of slots along each pivot post, the cover plate being configured to selectively pivot about each of the first and second axes of rotation.

11. The cover of claim 10 wherein the cover plate defines a uniform cross-section except for the slots.

12. A hinge piece for hingedly mounting a cover plate with a pivot member to a cable trough, the hinge piece comprising:
    first and second arms coupled by a middle member, the arms and middle member together forming a U-shaped recess for receiving a sidewall of the trough between the first and second arms; and
    a detent pocket for releasably receiving the pivot member.

13. The hinge piece of claim 12 wherein the detent pocket includes first and second opposed extension members each having a retaining boss projecting toward an interior of the pocket.

14. The hinge piece of claim 13 wherein a push tab extends from the second extension member wherein by pushing the push tab the second extension member may be flexed away from the first extension member.

15. The hinge piece of claim 12 wherein an interior side of the second arm includes a retention tab having a ramped surface.

16. The hinge piece of claim 12 wherein one of the first and second arms defines an aperture and wherein the hinge piece further comprises a fastener disposed through the aperture for fastening the hinge piece to the sidewall of the trough.

17. A cable trough and cover assembly comprising:
    a cable trough having a base and two sidewalls extending from the base;
    a cover plate having a pivot member along at least one edge;
    a hinge pedestal including an extending body having a first end and a second end, a base portion positioned at the second end of the extending body and secured to the base of the cable trough, and receiving structure positioned at the first end of the extending body, the receiving structure defining a pocket, the pocket sized to releasably receive the pivot member of the cover plate so that the cover plate may be rotated relative to the trough by rotation of the pivot member within the pocket.

18. The cable trough and cover assembly of claim 17 wherein the pocket is a first pocket and wherein the receiving structure includes a second pocket and wherein the cover plate is a first cover plate, and wherein the assembly includes a second cover plate having a pivot member along at least one edge, the second pocket sized to receive the pivot member of the second cover plate so that the second cover plate may be adjustably positioned at a plurality of angles relative to the trough by rotation of the pivot member of the second cover plate within the second pocket.

19. The cable trough and cover assembly of claim 17 wherein the base portion of the hinge pedestal is secured to the base of the cable trough at a central region located between the two sidewalls.

20. A cable trough assembly comprising:
    a cable trough having a base and first and second sidewalls extending from the base;
    first and second hinge pieces each defining a pocket and each having first and second arms coupled by a middle member, the arms and middle member together forming a U-shaped recess, the U-shaped recess of the first hinge piece receiving first sidewall, the U-shaped recess of the second hinge piece receiving the second sidewall;
    first and second cover plates each having a pivot member along at least one edge, the pivot members of the cover plates being releasably received in the pockets of the first and second hinge pieces respectively so that the cover plates may be adjustably positioned at a plurality of angles relative to the sidewalls by rotation of the pivot members within the pockets of the hinge members.

21. The cable trough assembly of claim 20 further comprising a pedestal inserted between the sidewalls of the trough, the pedestal having a base portion secured to the base of the cable trough and an extending body extending away from the base portion, wherein the cover plates are supported by the extending body of the pedestal.

22. The cable trough assembly of claim 21 wherein the pedestal defines at least one pocket sized to receive one of the pivot members of the first and second cover plates, so that the cover plates may be releasably and hingedly received by the pockets of the hinge pieces or the pockets of the pedestal.

23. A hinge pedestal for mounting a cover plate with a pivot member to a cable trough, the hinge pedestal comprising:
- a base selectively positionable within the cable trough;
- an upstanding wall extending from the base, the upstanding wall defining at least one pocket sized to receive the pivot member of the cover plate so that the cover plate may be releasably received in the pocket and so that the cover plate may be rotated relative to the upstanding wall by rotation of the pivot member within the pocket.

24. The hinge pedestal of claim 23 wherein the upstanding wall defines two pockets.

25. The hinge pedestal of claim 23 further comprising an adhesive disposed on a bottom surface of the base.

26. A method of covering a cable trough having two sidewalls, the method comprising the steps of:
- providing at least one hinge piece having a detent pocket and first and second arms coupled by a middle member, the arms and middle member together forming a U-shaped recess;
- positioning the hinge piece so one of the sidewalls of the cable trough is received in the U-shaped recess;
- providing a cover plate having a pivot member along at least one edge;
- snapping the pivot member of the cover plate into the detent pocket of the hinge piece.

27. A cover and hinge assembly for covering a cable trough having a base and two sidewalls, the assembly comprising:
- a cover plate having a first pivot member along a first edge and a second pivot member along a second edge opposite the first edge;
- a first hinge member defining a first pocket, the first pocket releasably holding the first pivot member of the cover plate so that the cover plate may be rotated relative to the first hinge member by rotation of the first pivot member within the first pocket in a first direction; and
- a second hinge member defining a second pocket, the second pocket releasably holding the second pivot member of the cover plate so that the cover plate may be rotated relative to the second hinge member by rotation of the second pivot member within the second pocket in a second opposite direction.

28. A cable trough and cover assembly, comprising:
- a cable trough having a base and two sidewalls, each of the sidewalls having a top edge and an opposite bottom edge extending from the base, the top edges of the sidewalls defining a top opening of the cable trough;
- a cover plate having a pivot member; and
- a hinge member defining a detent pocket, the hinge member being selectively positioned along the top edge of the sidewall of the cable trough; the detent pocket releasably holding the pivot member of the cover plate so that the cover plate may be rotated relative to the hinge member by rotation of the pivot member within the detent pocket.

29. The cover and hinge assembly of claim 28 wherein the cover plate at least partially covers the top opening of the cable trough.

30. A cable trough and cover assembly comprising:
- a cable trough having a base and two sidewalls extending from the base;
- a first cover plate having a first pivot member along at least one edge;
- a second cover plate having a second pivot member along at least one edge; and
- a hinge pedestal having a base portion secured to the base of the cable trough and a extending body extending away from the base portion, the extending body defining a first pocket and a second pocket, each of the first and second pockets sized to releasably receive the first and second pivot members of each of the first and second cover plates so that the cover plates may be rotated relative to the trough by rotation of the respective pivot member within the respective pocket.

31. A cable trough and cover assembly comprising:
- a cable trough having a base and two sidewalls extending from the base;
- a cover plate having a pivot member along at least one edge;
- a hinge pedestal having a base portion secured to the base of the cable trough at a central region located between the two sidewalls, and a extending body extending away from the base portion, the extending body defining a pocket, the pocket sized to releasably receive the pivot member of the cover plate so that the cover plate may be rotated relative to the trough by rotation of the pivot member within the pocket.

32. A cover and hinge assembly for a cable trough, comprising:
- a cover plate having a pivot member along at least one edge, the cover plate being configured to cover at least a portion of the cable trough;
- a hinge member including first and second arms coupled by a middle member to form a U-shaped recess for receiving a sidewall of the trough between the first and second arms, the hinge member also defining a detent pocket, the pocket releasably holding the pivot member of the cover plate so that the cover plate may be rotated relative to the hinge member by rotation of the pivot member within the pocket.

33. The cover and hinge assembly of claim 32 wherein the cover plate defines at least one slot for receiving a portion of the hinge member.

34. The cover and hinge assembly of claim 32 wherein the pivot member is a rounded post and wherein the pocket is a rounded channel.

35. The cover and hinge assembly of claim 32 wherein the pivot member has a generally circular cross-section.

36. A hinge pedestal for mounting a cover plate with a pivot member to a cable trough, the hinge pedestal comprising:
- a base;
- an upstanding wall extending from the base, the upstanding wall defining two pockets sized to receive the pivot member of the cover plate so that the cover plate may be releasably received in one of the pockets and so that the cover plate may be rotated relative to the upstanding wall by rotation of the pivot member within the one pocket.

37. A hinge pedestal for mounting a cover plate with a pivot member to a cable trough, the hinge pedestal comprising:
  a base;
  an adhesive disposed on a bottom surface of the base; and
  an upstanding wall extending from the base, the upstanding wall defining at least one pocket sized to receive the pivot member of the cover plate so that the cover plate may be releasably received in the pocket and so that the cover plate may be rotated relative to the upstanding wall by rotation of the pivot member within the pocket.

38. A cover for covering a cable trough, the cover plate comprising:
  a cover plate having first and second opposite edges,
  a first pivot post disposed along the first edge of the cover plate and defining a first axis of rotation;
  a second pivot post disposed along the second edge of the cover plate, the second pivot post being parallel to the first pivot post and defining a second different axis of rotation;
  wherein the cover plate defines at least one slot having closed ends positioned along each pivot post, the cover plate being configured to selectively pivot about each of the first and second axes of rotation.

* * * * *